(12) United States Patent
Kondo et al.

(10) Patent No.: US 10,441,988 B2
(45) Date of Patent: Oct. 15, 2019

(54) APPARATUS AND METHOD FOR CHECKING INCLINATION OF CUSHION PAD

(71) Applicant: AIDA ENGINEERING, LTD., Sagamihara-shi, Kanagawa (JP)

(72) Inventors: Tadahiro Kondo, Sagamihara (JP); Junji Makabe, Sagamihara (JP)

(73) Assignee: Aida Engineering, Ltd., Kanagawa (JP)

( * ) Notice: Subject to any disclaimer, the term of this patent is extended or adjusted under 35 U.S.C. 154(b) by 398 days.

(21) Appl. No.: 14/962,808

(22) Filed: Dec. 8, 2015

(65) Prior Publication Data

US 2016/0184876 A1 Jun. 30, 2016

(30) Foreign Application Priority Data

Dec. 26, 2014 (JP) ................................ 2014-264313

(51) Int. Cl.
*G01C 5/00* (2006.01)
*G01C 9/00* (2006.01)
(Continued)

(52) U.S. Cl.
CPC .............. *B21D 24/02* (2013.01); *B30B 15/16* (2013.01); *B30B 15/26* (2013.01); *B30B 15/287* (2013.01); *G01C 5/00* (2013.01); *G01C 9/00* (2013.01)

(58) Field of Classification Search
CPC ..... B30B 15/0029; B30B 15/16; B30B 15/26; B30B 15/287; B21D 24/02; B21D 22/22; G01C 5/00; G01C 9/00
See application file for complete search history.

(56) References Cited

U.S. PATENT DOCUMENTS 5,138,857 A * 8/1992 Siegert ................... B21D 24/08
72/21.1
5,361,615 A * 11/1994 Kirii ....................... B21D 24/02
100/99
(Continued)

FOREIGN PATENT DOCUMENTS

CN 103963335 A 8/2014
JP WO 2013150653 A1 * 10/2013 ............. G01B 5/008
JP 2014-140871 A 8/2014

OTHER PUBLICATIONS

European Search Report EP Application No. 15197012.6 dated Jun. 9, 2016.
(Continued)

*Primary Examiner* — Gregory D Swiatocha
(74) *Attorney, Agent, or Firm* — McDermott Will & Emery LLP

(57) ABSTRACT

An apparatus for checking an inclination of a cushion pad includes: a plurality of height position detectors that detect a plurality of respective height positions in a vertical direction at a plurality of positions different in a horizontal direction of the cushion pad; an inclination measurement unit that measures information on an inclination of the cushion pad in accordance with the plurality of height positions detected by the plurality of respective height position detectors; and an input/output unit that outputs the information on an inclination of the cushion pad measured by the inclination measurement unit to a display or a printer in a visible manner.

12 Claims, 14 Drawing Sheets

(51) Int. Cl.
*B21D 24/02* (2006.01)
*B30B 15/16* (2006.01)
*B30B 15/26* (2006.01)
*B30B 15/28* (2006.01)

(56) References Cited

U.S. PATENT DOCUMENTS

| | | | | |
|---|---|---|---|---|
| 5,419,169 A * | 5/1995 | Kirii | ...... | B21D 24/10 |
| | | | | 72/16.1 |
| 5,435,166 A * | 7/1995 | Sunada | ...... | B21D 24/02 |
| | | | | 72/351 |
| 5,471,861 A * | 12/1995 | Kirii | ...... | B21D 24/14 |
| | | | | 72/351 |
| 5,692,404 A * | 12/1997 | Kirii | ...... | B21D 24/00 |
| | | | | 72/15.1 |
| 9,808,848 B2 | 11/2017 | Kohno et al. | | |
| 2005/0274243 A1 | 12/2005 | Shiroza et al. | | |
| 2009/0025444 A1 * | 1/2009 | Suzuki | ...... | B21D 24/02 |
| | | | | 72/16.1 |
| 2014/0202223 A1 | 7/2014 | Kohno et al. | | |
| 2014/0366606 A1 | 12/2014 | Kohno et al. | | |
| 2015/0088454 A1 * | 3/2015 | Sugiyama | ...... | G01B 5/008 |
| | | | | 702/155 |

OTHER PUBLICATIONS

Notification of Reasons for Rejection Japanese Patent Application No. 2014-264313 dated Jun. 2, 2016 with partial English translation.

Chinese Office Action issued in corresponding Chinese Patent Application No. 201510993970.0, dated May 31, 2018, with English Translation.

Second Office Action issued in Chinese Patent Application No. 201510993970.0, dated Feb. 2, 2019, with English translation.

* cited by examiner

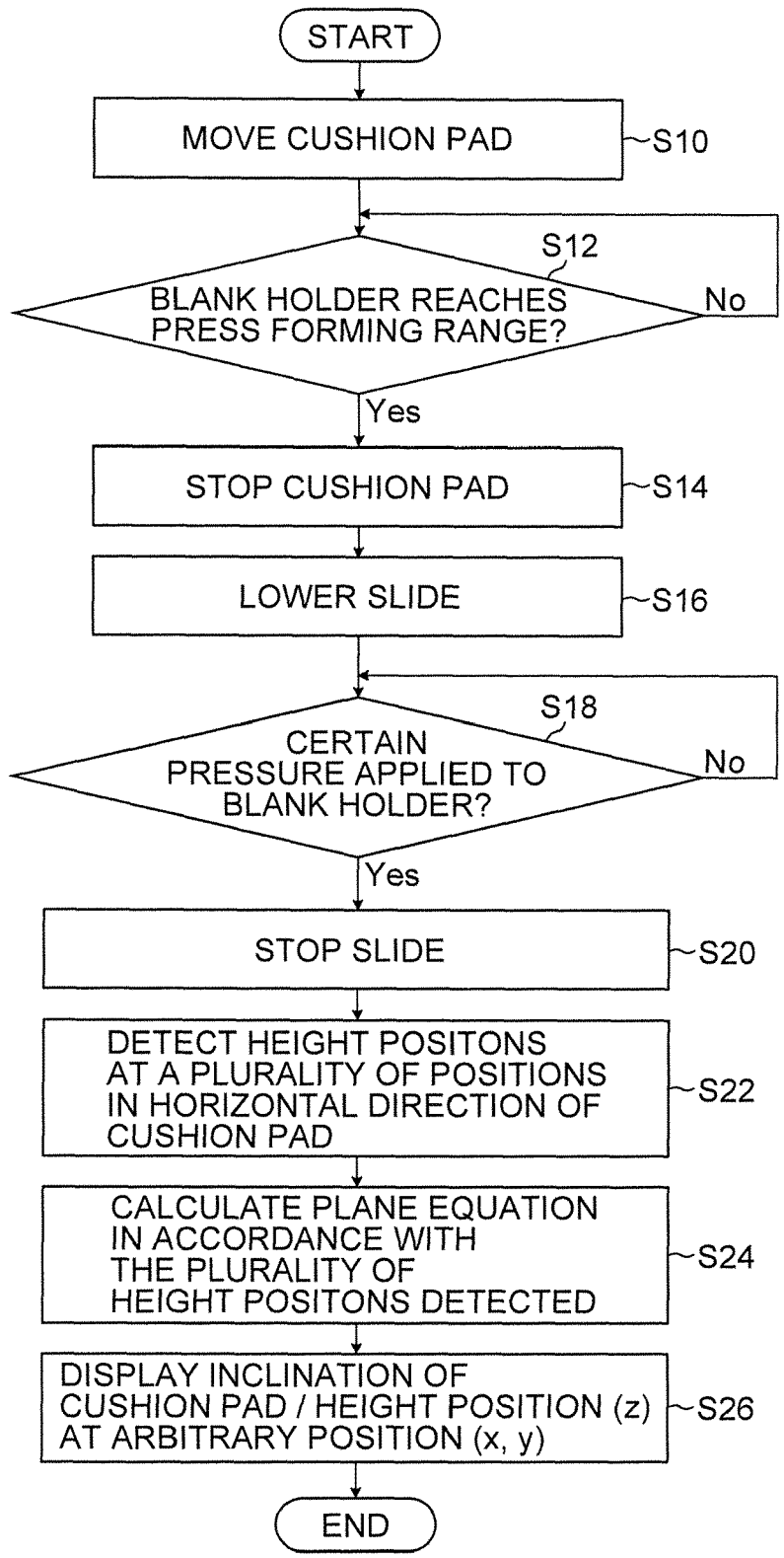

APPARATUS AND METHOD FOR CHECKING INCLINATION OF CUSHION PAD

BACKGROUND OF THE INVENTION

Field of the Invention

The present invention related to an apparatus and a method for checking an inclination of a cushion pad, and more particularly to an art of properly and efficiently performing shim adjustment in a die cushion device.

Description of the Related Art

FIGS. 15A and 15B are schematic views each of which illustrates a press machine provided with a die cushion device, and which illustrate a state before starting press forming and a state during the press forming, respectively. An upper die 120 is attached to a lower face of a slide 104 of the press machine, and a lower die 122 is attached to an upper face of a bolster 108. When pressing forming material, the press machine lowers the slide 104 to perform forming of the material between the upper die 120 and the lower die 122.

The die cushion device applies die cushion force to a cushion pad 202 (or the blank holder 206) during a die cushion stroke from a die cushion standby position to press bottom dead center in a state where the upper die 120 and the lower die 122 (a blank holder 206) are in close contact (or contact by surface not only point) with each other through the material.

In general, each of the slide 104 and the bolster 108 of the press machine is configured to be horizontal. In addition, in a state where the cushion pad 202 is held at the standby position, a flat face of the cushion pad 202 (blank holder 206 supported through cushion pins 208) is set so as to be parallel to the slide 104 (a flat face to which the upper die 120 is attached) of the press machine.

In the press machine configured as above, when a defective product occurs during forming with a die for which the die cushion device is used or when a product is preliminarily formed, a shim (a spacer) is sometimes inserted into the die for adjustment (shim adjustment) as a correction method for forming a non-defective product.

FIGS. 15A and 15B illustrate a case where a shim 207 with desired thickness is inserted into a shim adjustment position on the blank holder 206 (a shim adjustment position on the left side of the blank holder 206 in FIGS. 15A and 15B).

If the shim adjustment is performed, the upper die 120 and the blank holder 206 are not parallel to each other, and as illustrated in FIG. 15B, when the upper die 120 and the blank holder 206 are brought into close contact (or contact by surface not only point) with each other during forming, the cushion pad 202 is inclined by the blank holder 206 through the cushion pins 208.

When a state where the cushion pad 202 is held at the horizontal die cushion standby position as illustrated in FIG. 15A changes to a state where die cushion force control is performed as illustrated in FIG. 15B, the cushion pad 202 is inclined as the blank holder 206 is inclined by the shim adjustment, and is particularly inclined rapidly at the moment when control of die cushion force is started (when the upper die and the lower die collide with each other). Then, at the time when the control of die cushion force is started as illustrated in FIG. 15B (at the time of collision), a large difference in die cushion force between the right and left sides of the cushion pad 202 occurs to cause stability of the control of die cushion force to be impaired, whereby the die cushion force is asymmetrical between the right and left sides. The difference in the die cushion force on the right and left sides may cause material to be broken or may have an adverse effect on formability (particularly formability on the left side lagging in operation) to cause unevenness force in a plane to occur, whereby it is not favorable for forming.

Heretofore, in order to solve the problem above, there is provided a die cushion device in which information on an inclination of the cushion pad 202 during forming are detected by a plurality of die cushion position detection device so that a cushion pad is caused to wait so as to be parallel to a lower face of an upper die attached to a slide at a die cushion standby position (Patent Literature 1: Japanese Patent Application Laid-Open No. 2014-140871).

SUMMARY OF THE INVENTION

Shim adjustment for forming a non-defective product is performed by inserting a shim with an appropriate thickness into a plurality of shim adjustment positions on the blank holder 206 depending on experience and intuition of a user while a formed product (a defective) is viewed, however, the cushion pad 202 may be sometimes inclined beyond an allowable range during forming due to the shim adjustment (refer to FIG. 15B). In this case, even if forming of a non-defective becomes possible by the shim adjustment, forming is performed in a state where the cushion pad 202 is inclined beyond the allowable range. As a result, there is a problem in which galling of the cushion pin 208, abrasion of a slide portion of a hydraulic cylinder 204 for driving the cushion pad 202, and the like, are caused to shorten useful life of the die cushion device or to break the device.

On the other hand, in the die cushion device described in Patent Literature 1, since a cushion pad is caused to be held so as to be parallel to a lower face of an upper die attached to a slide, it is possible to solve the problem in which the cushion pad is inclined rapidly at the moment when control of die cushion force is started (when the upper die and the lower die collide with each other). However, it is impossible to eliminate an adverse effect on the die cushion device, caused by forming performed in a state where the cushion pad is inclined.

The present invention is made in light of the above-mentioned circumstances, and it is an object of the present invention to provide an apparatus and a method for checking an inclination of a cushion pad, capable of checking an inclination of the cushion pad to enable shim adjustment to be prevented from having an adverse effect on a die cushion device at the time of the shim adjustment as well as to enable the shim adjustment to be facilitated.

In order to achieve the object, an apparatus for checking an inclination of a cushion pad, in accordance with one aspect of the present invention, in a die cushion device including a cushion pad lifting and lowering mechanism that supports the cushion pad and generates die cushion force when a slide of a press machine is lowered, includes: a plurality of height position detectors that detect a plurality of respective height positions in a vertical direction at a plurality of positions different in a horizontal direction of the cushion pad; an inclination measurement unit that measures information on the inclination of the cushion pad in accordance with the plurality of height positions detected by the plurality of respective height position detectors; and an output unit that outputs the information on the inclination of the cushion pad measured by the inclination measurement unit in a visible manner.

According to the one aspect of the present invention, a user of the press machine is able to check the information on an inclination of the cushion pad at the time of adjustment or forming. Accordingly, it is possible to efficiently perform shim adjustment for forming a non-defective product as well as to prevent such shim adjustment as the cushion pad is inclined beyond an allowable range, whereby it is possible to safely perform forming without having an adverse effect on the die cushion device at the time of the shim adjustment.

In an apparatus for checking an inclination of a cushion pad in accordance with another aspect of the present invention, it is preferable that the output unit causes a display to display the information on the inclination of the cushion pad, or causes a printer to print the information on a paper medium.

In an apparatus for checking an inclination of a cushion pad in accordance with yet another aspect of the present invention, it is preferable that the inclination measurement unit includes a plane equation calculation unit that calculates a plane equation of the cushion pad in accordance with the plurality of height positions detected by the plurality of respective height position detectors, and that the output unit outputs information showing the inclination of the cushion pad in accordance with the plane equation calculated by the plane equation calculation unit, in a visible manner. If a plurality of respective height positions in a vertical direction at a plurality of positions different in a horizontal direction of the cushion pad (height positions of three or more points that are not in a straight line) is detected, a face of the cushion pad can be specified by solving a plane equation (to calculate a plane equation). In this way, the face of the cushion pad is specified to enable information showing an inclination of the cushion pad to be outputted in a visible manner. In addition, if height positions at two points different in the horizontal direction of the cushion pad are detected, it is possible to solve an equation of a straight line connecting two points whose height positions are different, whereby it is possible to output the information showing an inclination of the cushion pad in a visible manner.

In an apparatus for checking an inclination of a cushion pad in accordance with yet another aspect of the present invention, it is preferable that there is further provided a position indicator that specifies one or more arbitrary positions in the horizontal direction of the cushion pad, and that the inclination measurement unit includes: a plane equation calculation unit that calculates a plane equation of the cushion pad in accordance with the plurality of height positions detected by the plurality of respective height position detectors; and a height position calculation unit that calculates a height position at the specified arbitrary position in accordance with the plane equation calculated by the plane equation calculation unit and the arbitrary position specified by the position indicator, and that the output unit outputs information showing the height position calculated by the height position calculation unit, at the arbitrary position specified by the position indicator, in a visible manner.

In an apparatus for checking an inclination of a cushion pad in accordance with yet another aspect of the present invention, it is preferable that the output unit outputs the information on the inclination of the cushion pad to a storage unit by associating the information with a die attached to the press machine so that the storage unit stores the information.

In an apparatus for checking an inclination of a cushion pad in accordance with yet another aspect of the present invention, it is preferable that there is provided an input unit that reads out the stored information on the inclination of the cushion pad from the storage unit in accordance with a die attached to the press machine, the information being associated with the die, and that the output unit outputs the information on an inclination of the cushion pad, read out by the input unit, in a visible manner. Accordingly, in a case where a die is attached to the press machine, if information on an inclination of the cushion pad is stored in the storage unit in association with the attached die, it is possible to output the information on an inclination of the cushion pad stored in the storage unit in a visible manner without detection and the like of a plurality of height positions in the cushion pad.

In an apparatus for checking an inclination of a cushion pad in accordance with yet another aspect of the present invention, it is preferable that there are further provided: a determination unit that determines whether the information on the inclination of the cushion pad measured by the inclination measurement unit is beyond an allowable range; and a control unit that issues a warning or stops the press machine if it is determined by the determination unit that the information on the inclination of the cushion pad is beyond the allowable range. Accordingly, it is possible to prevent shortening of useful life of the die cushion device or breakage of the device, caused by the press machine that is operated while the inclination of the cushion pad is beyond the allowable range.

In an apparatus for checking an inclination of a cushion pad in accordance with yet another aspect of the present invention, it is preferable that the plurality of height position detectors detect the plurality of respective height positions in a state where an upper die attached to the slide and a blank holder coupled to the cushion pad through a plurality of cushion pins are in close contact (or contact by surface not only point) with each other. Because if the upper die attached to the slide is inclined due to abrasion, deviation, or the like, the blank holder (or the cushion pad) in close contact with the upper die is inclined along with the upper die.

In an apparatus for checking an inclination of a cushion pad in accordance with yet another aspect of the present invention, it is preferable that the plurality of height position detectors detect the plurality of respective height positions when the upper die and the blank holder are in close contact (or contact by surface not only point) with each other during press forming. Because the upper die and the blank holder are in close contact with each other in a state where a certain pressure or more is applied during the press forming, it is possible to accurately detect respective height positions at a plurality of positions in the cushion pad.

In an apparatus for checking an inclination of a cushion pad in accordance with yet another aspect of the present invention, it is preferable that there is provided a limit value calculation unit that calculates a limit value of an amount of shim adjustment at a shim adjustment position in accordance with the information on the inclination of the cushion pad measured by the inclination measurement unit and an allowable range of the information on the inclination of the cushion pad, and that the output unit outputs the limit value of the amount of shim adjustment at the shim adjustment position, calculated by the limit value calculation unit, in a visible manner. Accordingly, it is possible to perform the shim adjustment so that an inclination of the cushion pad is not beyond the allowable range.

The invention in accordance with yet another aspect is a method for checking an inclination of a cushion pad used in a die cushion device including a cushion pad lifting and lowering mechanism that supports the cushion pad and generates die cushion force when a slide of a press machine is lowered, and the method includes the steps of: detecting, by a plurality of height position detectors, a plurality of respective height positions in a vertical direction at a plurality of positions different in a horizontal direction of the cushion pad; measuring, by an inclination measurement unit, information on the inclination of the cushion pad in accordance with the plurality of height positions detected; and outputting the information on the inclination of the cushion pad measured in a visible manner.

In a method for checking an inclination of a cushion pad in accordance with yet another aspect of the present invention, it is preferable that the plurality of height position detectors detect the plurality of respective height positions in a state where an upper die attached to the slide and a blank holder coupled to the cushion pad through a plurality of cushion pins are in close contact (or contact by surface not only point) with each other.

In a method for checking an inclination of a cushion pad in accordance with yet another aspect of the present invention, it is preferable that the plurality of height position detectors detect the plurality of respective height positions when the upper die and the blank holder are in close contact (or contact by surface not only point) with each other during press forming.

In a method for checking an inclination of a cushion pad in accordance with yet another aspect of the present invention, it is preferable that there are further provided the steps of: moving the cushion pad until the blank holder reaches a press forming range by using the cushion pad lifting and lowering mechanism and then stopping the cushion pad; and lowering the slide until an upper die attached to the slide is brought into close contact (or contact by surface not only point) with the blank holder and stopping the slide in a state where a certain pressure is applied to the blank holder, and that the plurality of height position detectors detect the plurality of respective height positions when the upper die and the blank holder are in close contact with each other and are stopped in a state where the certain pressure is applied. Because the certain pressure is applied to the blank holder from the upper die attached to the slide, so that the blank holder is brought into close contact with the upper die.

In a method for checking an inclination of a cushion pad in accordance with yet another aspect of the present invention, it is preferable that there are further provided the steps of: moving the slide until an upper die attached to the slide reaches a press forming range and then stopping the slide; and raising the cushion pad until the blank holder is brought into close contact (or contact by surface not only point) with the upper die by using the cushion pad lifting and lowering mechanism and then stopping the cushion pad in a state where a certain pressure is applied to the blank holder, and that the plurality of height position detectors detect the plurality of respective height positions when the upper die and the blank holder are in close contact with each other and are stopped in a state where the certain pressure is applied. Because reaction force against the certain pressure from the upper die attached to the slide is applied to the blank holder, so that the blank holder is brought into close contact with the upper die.

According to the present invention, it is possible to check information on an inclination of the cushion pad. Accordingly, it is possible to prevent shim adjustment from having an adverse effect on a die cushion device at the time of the shim adjustment as well as to facilitate the shim adjustment.

BRIEF DESCRIPTION OF THE DRAWINGS

FIG. 11 is a flow chart illustrating a first embodiment of a method for checking an inclination of a cushion pad in accordance with the present invention;

DETAILED DESCRIPTION OF THE EMBODIMENTS

Hereinafter, with reference to accompanying drawings, embodiments of an apparatus and a method for checking an inclination of a cushion pad in accordance with the present invention will be described in detail.

(Structure of Press Machine)

Figure 1:
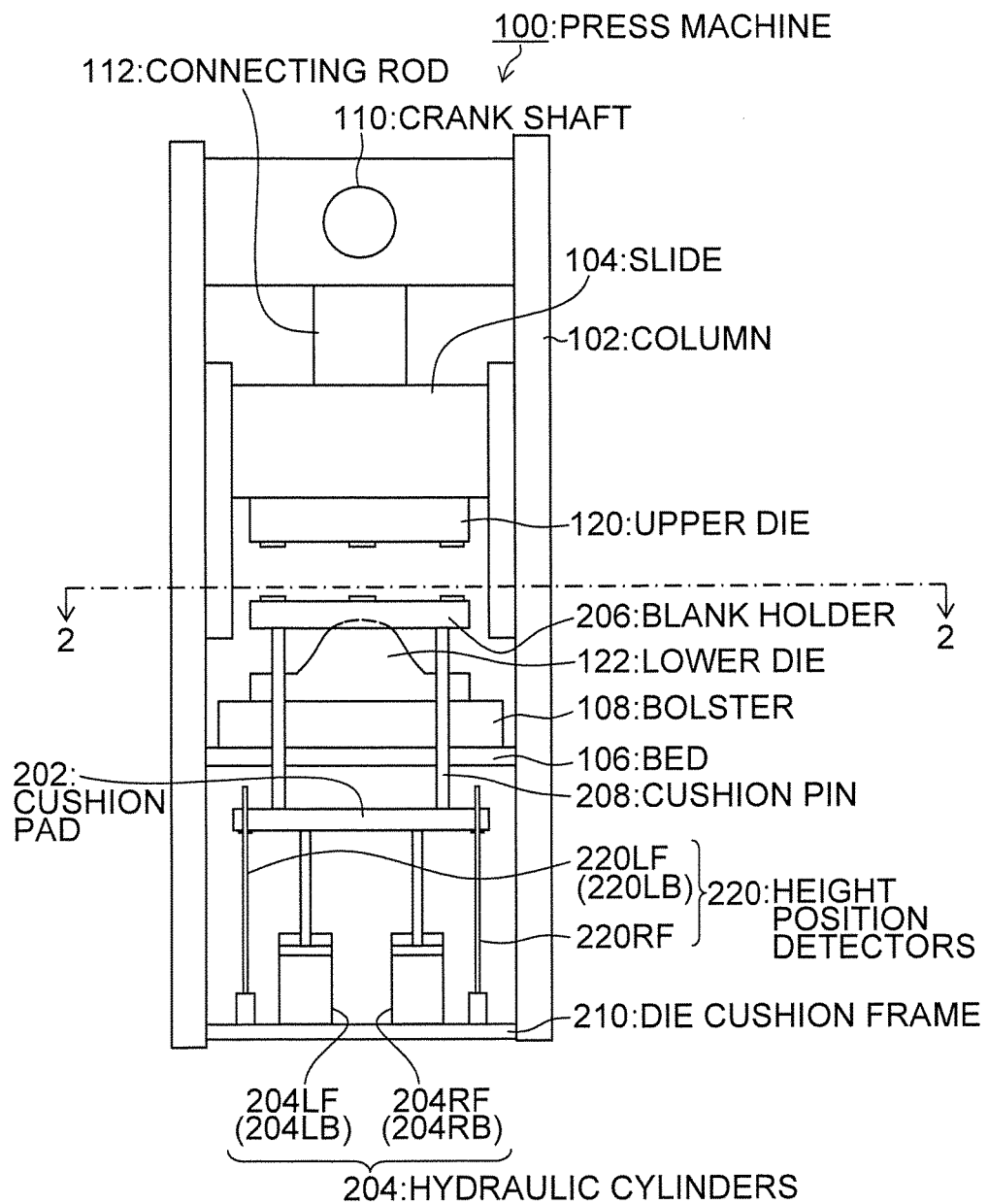
FIG. 1 is a structural view illustrating an embodiment of a press machine provided with a die cushion device to which an apparatus and a method for checking an inclination of a cushion pad in accordance with the present invention is applied.

FIG. 1 is a structural view illustrating an embodiment of a press machine provided with a die cushion device to which an apparatus and a method for checking an inclination of a cushion pad in accordance with the present invention is applied.

A press machine 100 illustrated in FIG. 1 includes a column (frame) 102, a slide 104, a bolster 108 fixed on a bed 106, crankshaft 110, a connecting rod 112. The slide 104 is movably guided in a vertical direction by a guide section provided in the column 102. In addition, the crankshaft 110 is coupled to the slide 104 through the connecting rod 112. The crankshaft 110 is configured so that rotational driving force is transmitted to it through a servo motor and a deceleration gear mechanism, which are not illustrated. When the crankshaft 110 is turned by the servo motor, the slide 104 is moved in an up and down direction in FIG. 1 by driving force applied through the crankshaft 110 and the connecting rod 112.

The upper die 120 and the lower die 122 constitute a die, and the upper die 120 of the die is attached to a lower face of the slide 104 and the lower die 122 of the die is attached to an upper face of the bolster 108.

Each of the slide 104 and the bolster 108 is configured so as to be leveled, and the lower face of the slide 104 to which the upper die 120 is to be attached and the upper face of the bolster 108 to which the lower die 122 is to be attached are parallel to each other. In addition, the slide 104 is positioned with respect to the bolster 108 so that a slide position detector (not illustrated) is able to detect the slide 104.

(Structure of Die Cushion Device)

Figure 3:
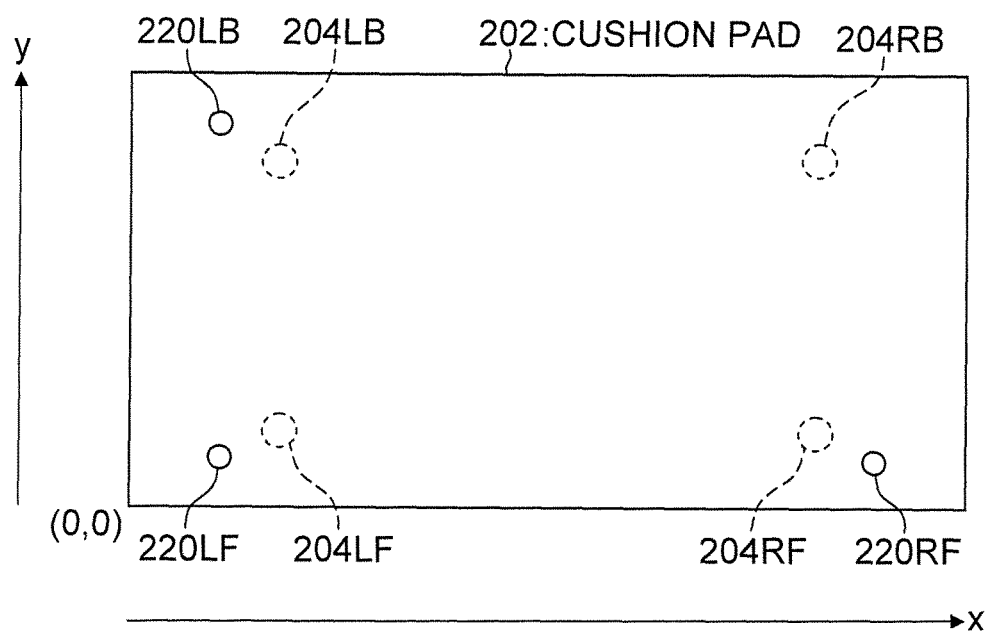
FIG. 3 illustrates a position each of height position detectors and hydraulic cylinders in the cushion pad.
Figure 4:
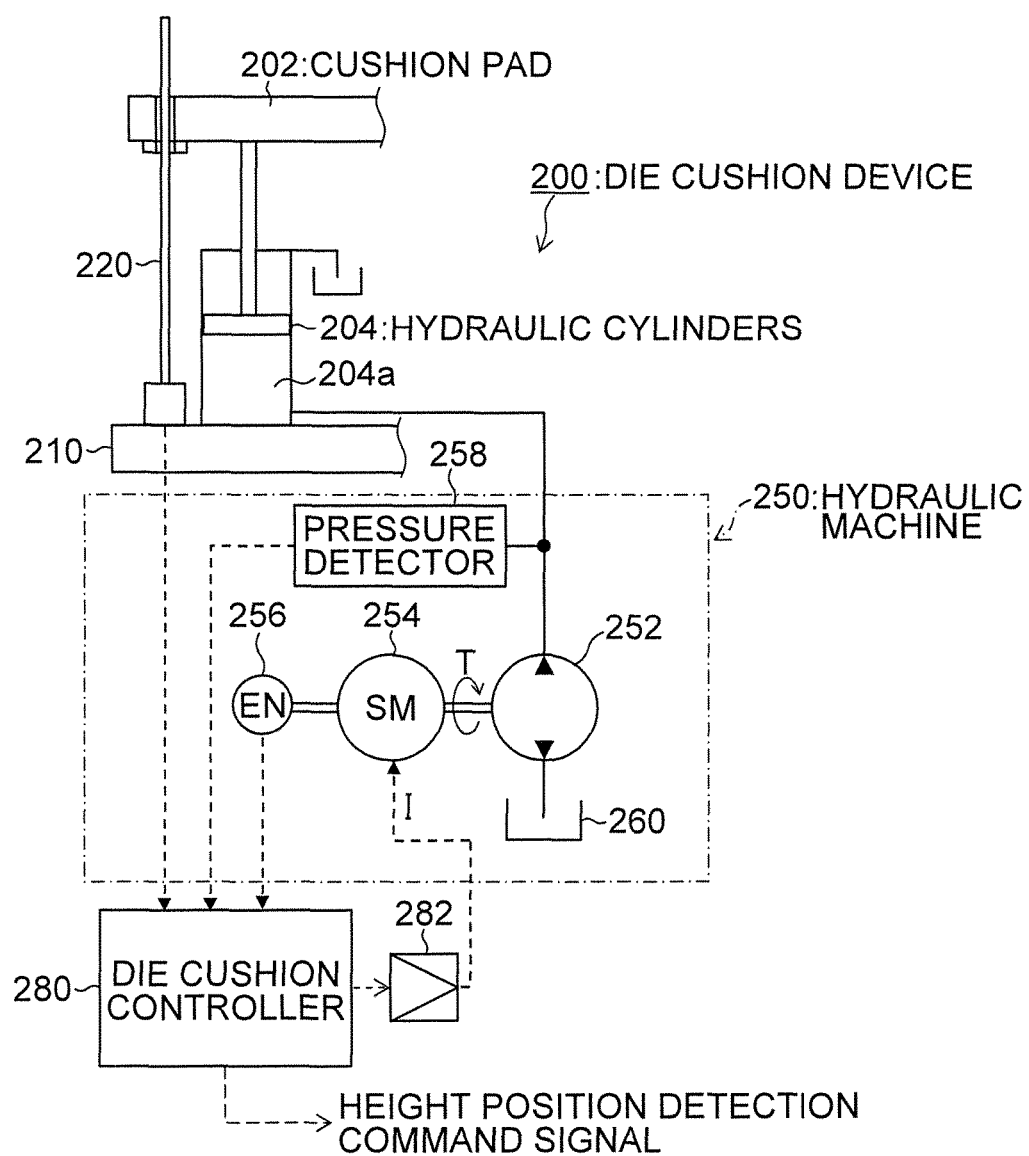
FIG. 4 illustrates an embodiment of a hydraulic machine that drives a hydraulic cylinder, and a die cushion controller that controls the hydraulic machine.

A die cushion device 200 includes the cushion pad 202, four hydraulic cylinders 204 (hydraulic cylinders 204LF, 204RF, 204LB, and 204RB, refer to FIG. 3) that support the cushion pad 202, a hydraulic machine 250 that supplies pressure oil to each of the hydraulic cylinders 204 illustrated in FIG. 4, and a die cushion controller 280 that controls the hydraulic machine 250.

The hydraulic cylinder 204 and the hydraulic machine 250 serve as a cushion pad lifting and lowering mechanism that causes the cushion pad 202 to perform lifting and lowering operation, as well as serve as a die cushion force occurrence unit that causes die cushion force to occur in the cushion pad 202 when the slide 104 is lowered.

There is provided the blank holder 206 in a space between the upper die 120 and the lower die 122, and a lower side of the blank holder 206 is supported by the cushion pad 202 through a plurality of cushion pins 208.

Figure 2:
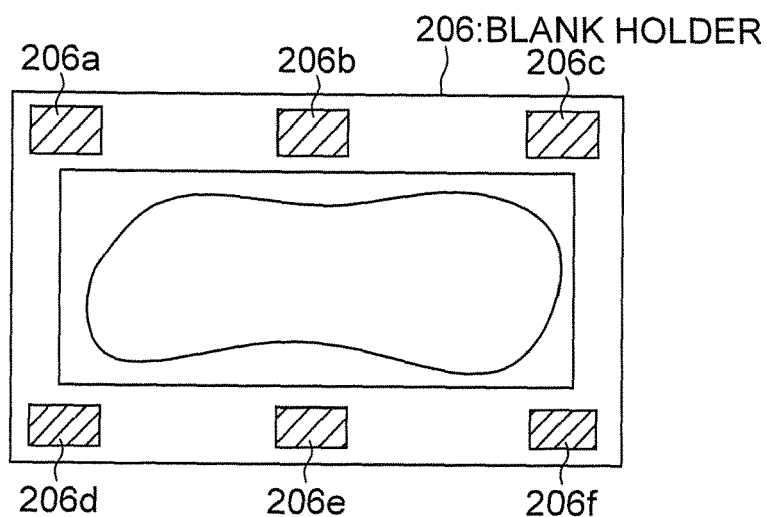
FIG. 2 is an illustration taken along arrows 2-2 illustrated in FIG. 1.

FIG. 2 is an illustration taken along arrows 2-2 illustrated in FIG. 1, and particularly illustrates a plane of the blank holder 206.

As illustrated in FIG. 2, the blank holder 206 includes six shim adjustment positions 206a to 206f, and it is possible to insert a shim with an arbitrary thickness into the shim adjustment positions 206a to 206f.

In general, at the time of shim adjustment, condition of contact between the upper die 120 and the blank holder 206 is determined from a product, and a shim with an appropriate thickness is inserted into a shim adjustment position corresponding to a weak contact position among the shim adjustment positions 206a to 206f to adjust the condition of contact. Accordingly, it is possible to form a non-defective product. The number of shim adjustment positions and a position of the shim adjustment are not limited to the embodiment, and a variety of them are available. In addition, the shim adjustment position is not limited to the upper face of the blank holder 206, and the shim adjustment position can be provided in a space between the blank holder 206 and the cushion pin 208.

Further, in a space between a die cushion frame 210 and the cushion pad 202, there is provided a plurality of height position detectors 220 (220LF, 220RF, and 220LB) that detect a plurality of respective height positions.

As illustrated in FIG. 3, the height position detectors 220 (220LF, 220RF, 220LB) detect respective height positions in a vertical direction (z direction) at three positions different in the horizontal direction of the cushion pad 202 (xy plane), which positions are not in a straight line. In the present example, the height position detectors 220 (220LF, 220RF, 220LB) are provided at positions near the hydraulic cylinders 204LF, 204RF, and 204LB, respectively, to detect height positions (z) of the cushion pad 202 at the respective three positions (x, y). In addition, although each of the height position detectors 220 is a linear scale that reads a magnetism scale with a magnetism detection head fixed to the cushion pad 202, the present invention is not limited to that. Further, the height position detectors 220 may be provided in a space between the bed 106 and the cushion pad 202.

FIG. 4 illustrates an embodiment of the hydraulic machine 250 that drives hydraulic cylinders 204, and the die cushion controller 280 that controls the hydraulic machine 250. Although each of the four hydraulic cylinders 204 is independently controlled, control of one hydraulic cylinder 204 is illustrated in FIG. 4.

The hydraulic machine 250 includes a hydraulic pump/motor 252, an electric servo motor 254 connected to a rotating shaft of the hydraulic pump/motor 252, an angular speed detector 256 that detects an angular speed (servo motor angular speed a)) of a drive shaft of the electric servo motor 254, and a pressure detector 258.

One port (discharge port) of the hydraulic pump/motor 252 is connected to a die cushion pressure occurrence chamber (lower chamber) 204a of the hydraulic cylinder 204, and the other post is connected to a tank 260.

The pressure detector 258 detects pressure acting in the lower chamber 204a of the hydraulic cylinder 204, and the angular speed detector 256 detects an angular speed of the drive shaft of the electric servo motor 254.

(Principle of Die Cushion Force Control)

Since die cushion force can be expressed by the product of pressure in the lower chambers 204a of the respective four hydraulic cylinders 204 and surface area of the respective cylinders, controlling of the die cushion force means controlling of the pressure in the lower chambers 204a of the respective four hydraulic cylinders 204.

Here, the following Expressions 1 to 3 hold, where P is die cushion pressure, T is servo motor torque, I is driving current of an electric servo motor, and each of ka, k2, and k4 is a proportion constant.

$$T = ka \cdot I \qquad \text{Expression 1}$$

$$P = k2 \cdot T \qquad \text{Expression 2}$$

$$P = k2 \cdot ka \cdot I = k4 \cdot I \qquad \text{Expression 3}$$

As illustrated in Expression 3, the die cushion pressure P is proportional to the driving current of the electric servo motor 254. Thus, it is possible to control the die cushion pressure P by controlling the electric current I to be applied to the electric servo motor 254.

The die cushion controller 280 performs die cushion force control during forming, and die cushion position control of removal (knockout) of a product from the lower die 122 after forming as well as of causing the cushion pad 202 to wait at a die cushion standby position.

During the die cushion force control, in order to control die cushion force (die cushion pressure) in accordance with a die cushion force command, the die cushion controller 280 receives a die cushion pressure detection signal indicating pressure in the lower chamber 204a of the hydraulic cylinder 204 detected by the pressure detector 258, and outputs a control signal for controlling the electric servo motor 254 on the basis of the die cushion force command and the die cushion pressure detection signal detected by the pressure detector 258.

The control signal is outputted to the electric servo motor 254 through an amplifier 282 to control driving of the electric servo motor 254. The hydraulic pump/motor 252 whose drive shaft is connected to the electric servo motor 254 is turned by driving torque applied by the electric servo motor 254 to supply pressure oil to the lower chamber 204a of the hydraulic cylinder 204, or to discharge the pressure oil from the lower chamber 204a.

The die cushion controller 280 receives a servo motor angular speed signal indicating an angular speed of the drive shaft of the electric servo motor 254 (a servo motor angular speed (ω)) detected by the angular speed detector 256 to use the signal as an angular speed feedback signal for securing dynamic stability of die cushion force.

In addition, during die cushion position control, the die cushion controller 280 outputs a control signal for controlling the electric servo motor 254 on the basis of a die cushion position command for causing the cushion pad 202 to wait at the die cushion standby position that is an initial position, and a height position detection signal detected by the height position detectors (die cushion position detectors) 220.

(Apparatus for Checking Inclination of Cushion Pad)

Figure 5:
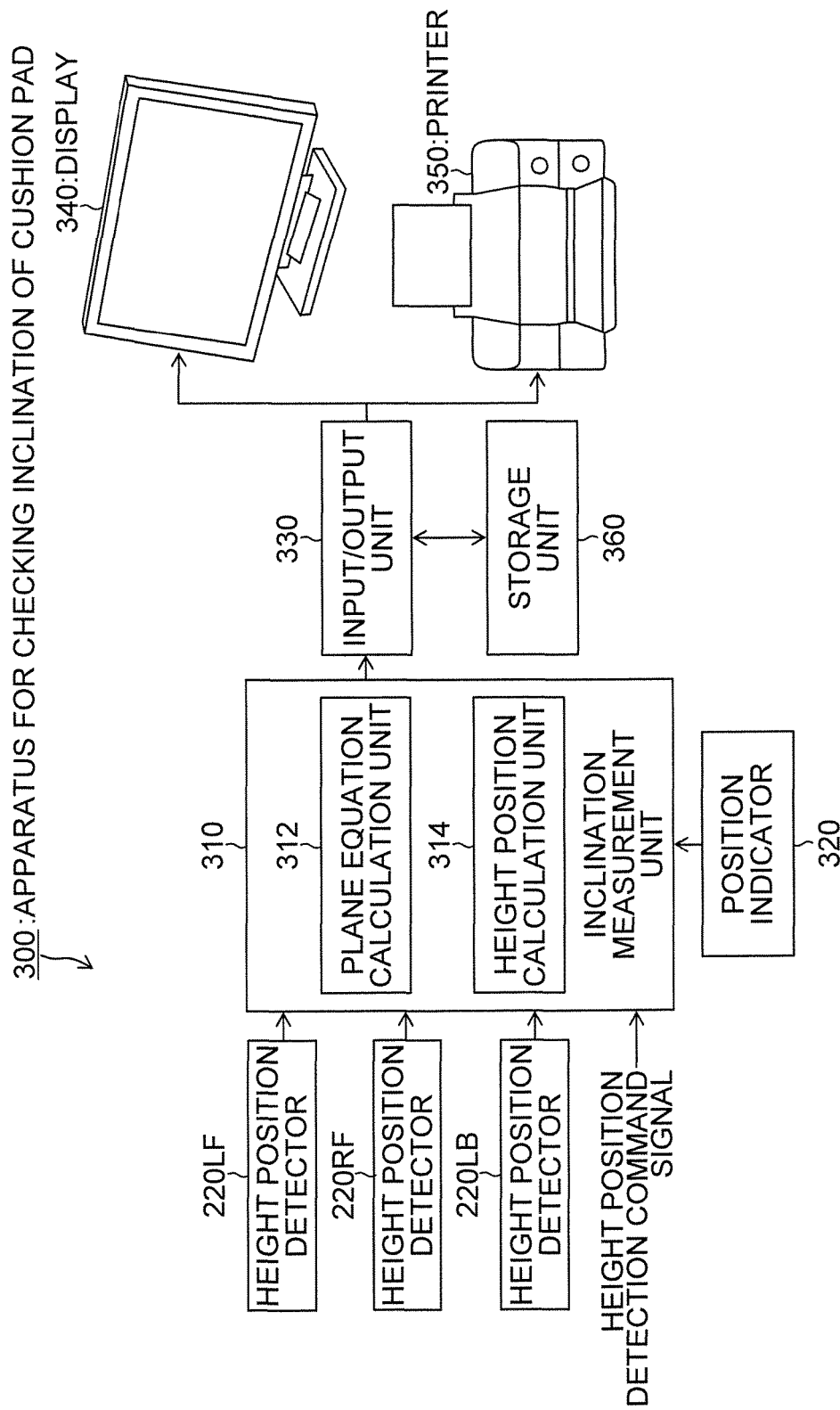
FIG. 5 is a block diagram illustrating an embodiment of an apparatus for checking an inclination of a cushion pad in accordance with the present invention.

FIG. 5 is a block diagram illustrating an embodiment of an apparatus for checking an inclination of a cushion pad in accordance with the present invention.

As illustrated in FIG. 5, an apparatus for checking an inclination 300 of a cushion pad includes the three height position detectors 220 (220LF, 220RF, and 220LB), an inclination measurement unit 310, a position indicator 320, an input unit and output unit (input/output unit) 330, a display 340, a printer 350, and a storage unit 360.

As illustrated in FIG. 3, the three height position detectors 220 (220LF, 220RF, and 220LB) detect respective height positions in the vertical direction at three positions different in the horizontal direction of the cushion pad 202, and output height position detection signals indicating the respective height positions detected to the inclination measurement unit 310.

The inclination measurement unit 310 is configured to receive a height position detection command signal from the die cushion controller 280 (refer to FIG. 4). Accordingly, the inclination measurement unit 310 acquires the height position detection signals outputted from the respective three height position detectors 220 when receiving the height position detection command signal from the die cushion controller 280. The die cushion controller 280 outputs the height position detection command signal to the inclination measurement unit 310 in a state where the upper die 120 and the blank holder 206 are in close contact (or contact by surface not only point) with each other. Details of output timing of the height position detection command signal will be described later.

The inclination measurement unit 310 measures information on an inclination of the cushion pad 202 in a state where the upper die 120 and the blank holder 206 are in close contact with each other, and includes the plane equation calculation unit 312 and the height position calculation unit 314. The information on an inclination of the cushion pad 202 includes information indicating an inclination of the cushion pad 202, or information indicating a height position at an arbitrary position in the cushion pad 202.

The plane equation calculation unit 312 calculates a plane equation indicating a plane of the cushion pad 202, defined by three height positions, on the basis of three height position detection signals acquired from the respective three height position detectors 220LF, 220RF, and 220LB.

Here, it is possible to express a plane equation in an xyz space by using the following expression.

$$ax+by+cz+d=0 \qquad \text{Expression 4}$$

where each of "a" to "d" is a coefficient of the plane equation. When positions of three points in the xyz space (positions (x, y) of the respective three height position detectors 220LF, 220RF, 220LB in the xy plane and the height positions (z) detected) are given, the plane equation calculation unit 312 calculates a plane equation passing through the three points (or acquires the coefficients "a" to "d" of the plane equation shown in Expression 4).

When the plane equation calculation unit 312 calculates the plane equation, the inclination measurement unit 310 calculates an inclination of the cushion pad 202 on the basis of the plane equation calculated. It is thought that the inclination of the cushion pad 202 is acquired as a maximum inclining angle and a direction of the maximum inclining of the cushion pad 202, or as an inclination of the cushion pad 202 in each axis (x, y) direction.

In addition, the position indicator 320 outputs information indicating one or more arbitrary positions in the horizontal direction of the cushion pad 202 to the inclination measurement unit 310 in response to operation by a user.

The height position calculation unit 314 calculates a height position at an arbitrary position in the cushion pad 202 on the basis of the plane equation calculated by the plane equation calculation unit 312 and positional information indicating the arbitrary position specified by the position indicator 320. That is, the height position calculation unit 314 substitutes an arbitrary position (x, y) into the plane equation shown in Expression 4 to calculate a height position (z) at the arbitrary position (x, y).

The input/output unit 330 outputs information on an inclination of the cushion pad 202 measured by the inclination measurement unit 310 (information indicating an inclination of the cushion pad 202 or a height position at an arbitrary position in the cushion pad 202) to the display 340 or the printer 350 so that a user can visually find the information, and causes the display 340 to display the information on an inclination of the cushion pad 202 in its screen, or the printer 350 to print the information on a paper medium.

In addition, the input/output unit 330 outputs the information on an inclination of the cushion pad 202 measured by the inclination measurement unit 310 to the storage unit 360 by associating the information with dies (the upper die 120 and the lower die 122) that are presently attached to the press machine 100, and causes the storage unit 360 to store the information.

Further, in a case where the information on an inclination of the cushion pad 202 is stored in the storage unit 360 in association with the dies that are presently attached to the press machine 100, the input/output unit 330 is able to read out the information on an inclination of the cushion pad 202, associated with the attached dies, from the storage unit 360, and then to output the information on an inclination of the cushion pad 202 read out to the display 340 or the printer 350. Accordingly, in a case where information on an inclination of the cushion pad 202 has been previously measured and stored in the storage unit 360, it is possible to cause the display 340 to display the information on an inclination of the cushion pad 202, or the printer 350 to print the information on a paper medium without performing detection of a height position in the cushion pad 202, measurement of an inclination, or the like, again.

In a case where information on an inclination of the cushion pad 202 is stored in the storage unit 360 by associating the information with dies that are presently attached to the press machine 100, it is preferable that information on an inclination of the cushion pad 202 acquired before shim adjustment is stored in the storage unit 360. Because parallelism between the blank holder and the cushion pad varies, if the shim adjustment is performed. In addition, in a case where information on an inclination of the cushion pad 202 after the shim adjustment is stored in the storage unit 360, it is preferable that a position of the shim adjustment and an amount of the shim adjustment are stored together with the information.

(First Display Example of Information on Inclination of Cushion Pad)

Figure 6:
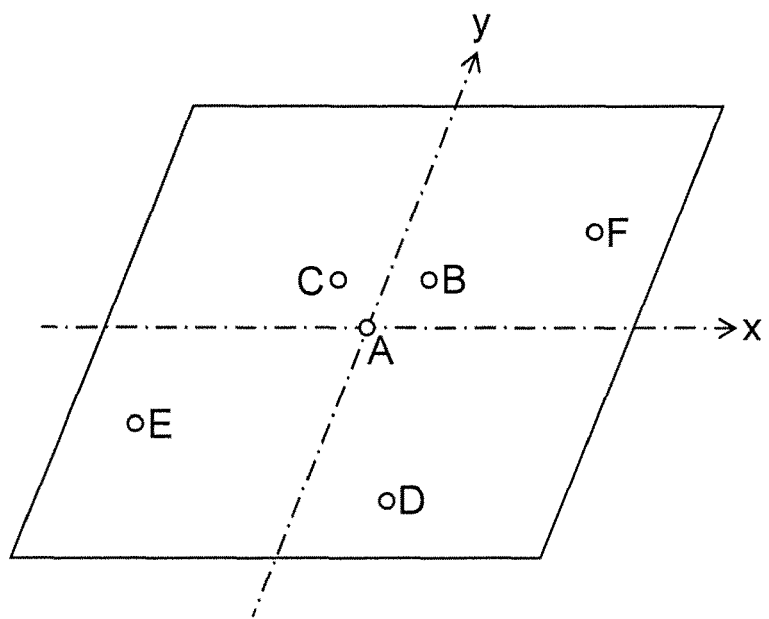
FIG. 6 illustrates a first display example of information on an inclination of the cushion pad.

FIG. 6 illustrates a first display example of information on an inclination of the cushion pad.

As described before, in a state where the upper die 120 and the blank holder 206 are in close contact with each other, when the height position detectors 220LF, 220RF, and 220LB detect respective height positions (z) at three positions (x, y) different in the horizontal direction of the cushion pad 202, the plane equation calculation unit 312 is able to calculate a plane equation passing through positions of three points in the xyz space.

Here, the assumption is made that the plane equation calculation unit 312 calculates the following plane equation.

$$0.1x+0.2y+1.0z+30=0 \qquad \text{Expression 5}$$

Here, as illustrated in the table of FIG. 6, if arbitrary six positions A to F in a plane (xy face) in the horizontal direction of the cushion pad 202 are specified, the height position calculation unit 314 is able to calculate height positions (z) of the respective six positions A to F from the plane equation of Expression 5. In this way, it is possible to acquire positions (coordinates) in the xyz space of the respective six positions A to F.

The input/output unit 330 causes the display 340 to display the information on an inclination of the cushion pad illustrated in FIG. 6 (the table of coordinates of the respective six positions A to F, and the six positions A to F in the xy plane), or the printer 350 to print the information on a paper medium.

A user is able to find out an inclination of the cushion pad 202 from the information on an inclination of the cushion pad illustrated in FIG. 6, which is displayed in the display 340 or printed on the paper medium by the printer 350. For example, it is perceived that a height positon of each of the positions B, C, and F in first and second quadrants is lower than a height position of the position A at the center of the cushion pad 202, and a height position of each of the positions D and E in third and fourth quadrants is higher than the height position of the position A, whereby it is possible to find out which direction and to what extent the cushion pad 202 is inclined.

(Second Display Example of Information on Inclination of Cushion Pad)

Figure 7:
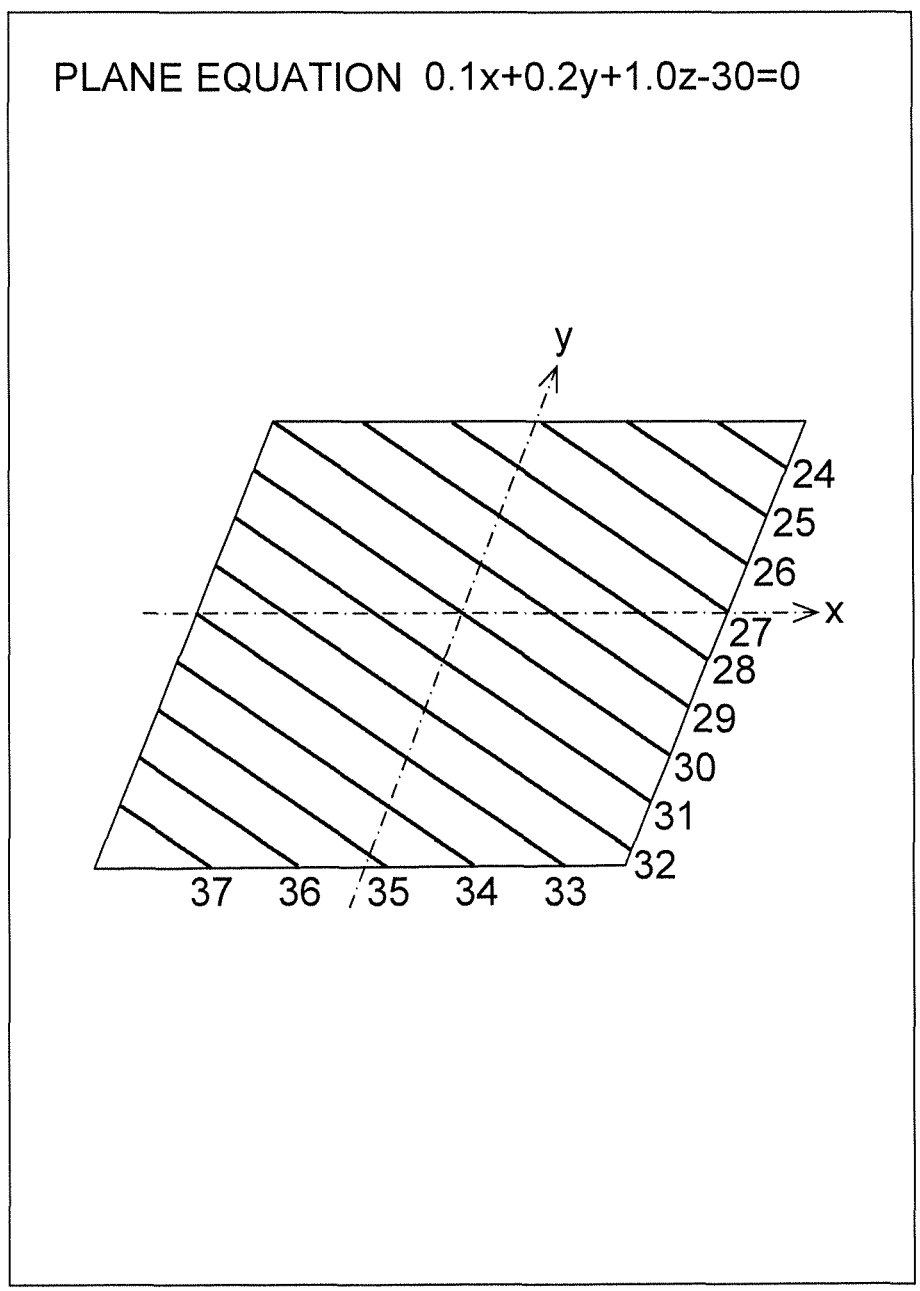
FIG. 7 illustrates a second display example of information on an inclination of the cushion pad.

FIG. 7 illustrates a second display example of information on an inclination of the cushion pad.

If the plane equation calculation unit 312 calculates the plane equation shown in Expression 5, it is possible to specify a plane of the cushion pad 202 in the xyz space.

FIG. 7 is a display example that intuitively illustrates a specified plane of the cushion pad 202, and illustrates contour lines of height positions (z) in the xy face with straight lines as well as the height position (z) with a numeric value for each of the contour lines.

A user is able to find out an inclination of the cushion pad 202 from the information on an inclination of the cushion pad illustrated in FIG. 7, which is displayed in the display 340 or printed on the paper medium by the printer 350. That is, the cushion pad 202 is inclined in a direction orthogonal to the contour line illustrated with the straight line, and it is possible to find out an angle of the inclination from a width and numeric value of the contour line.

(Third Display Example of Information on Inclination of Cushion Pad)

Figure 8:
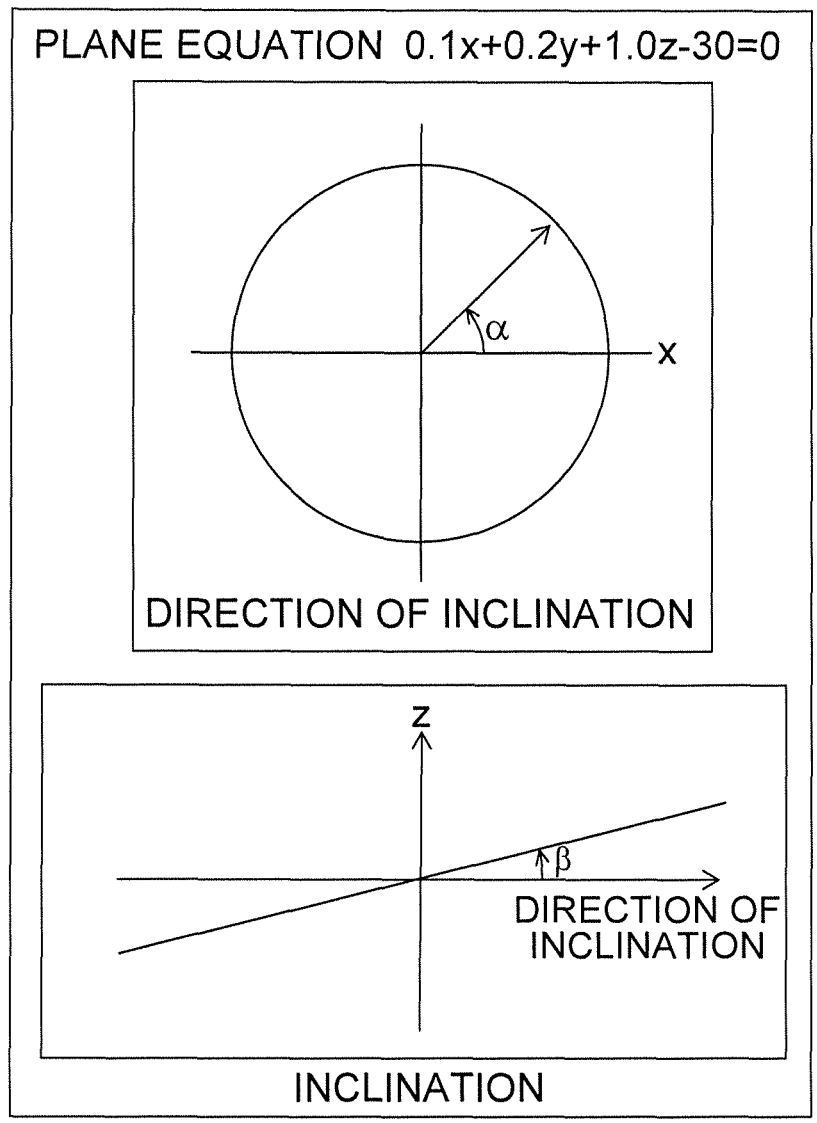
FIG. 8 illustrates a third display example of information on an inclination of the cushion pad.

FIG. 8 illustrates a third display example of information on an inclination of the cushion pad.

If the plane equation calculation unit 312 calculates the plane equation shown in Expression 5, it is possible to specify a plane of the cushion pad 202 in the xyz space.

FIG. 8 is an example that illustrates an inclination of a specified plane of the cushion pad 202 by graphic display, and that illustrates a direction of the inclination of the cushion pad 202 (a direction of a maximum inclination) and the inclination (angle).

A user is able to find out an inclination of the cushion pad 202 from the information on an inclination of the cushion pad illustrated in FIG. 8, which is displayed in the display 340 or printed on the paper medium by the printer 350. In the third display example illustrated in FIG. 8, it is perceived that the cushion pad 202 is inclined in an a-direction in the xy plane and an angle of a maximum inclination of the cushion pad 202 is β.

The inclination of the cushion pad 202 may be shown not only by a direction and angle of a maximum inclination but also by an inclination in an x-direction and an inclination in a y-direction.

(Fourth Display Example of Information on Inclination of Cushion Pad)

Figure 9:
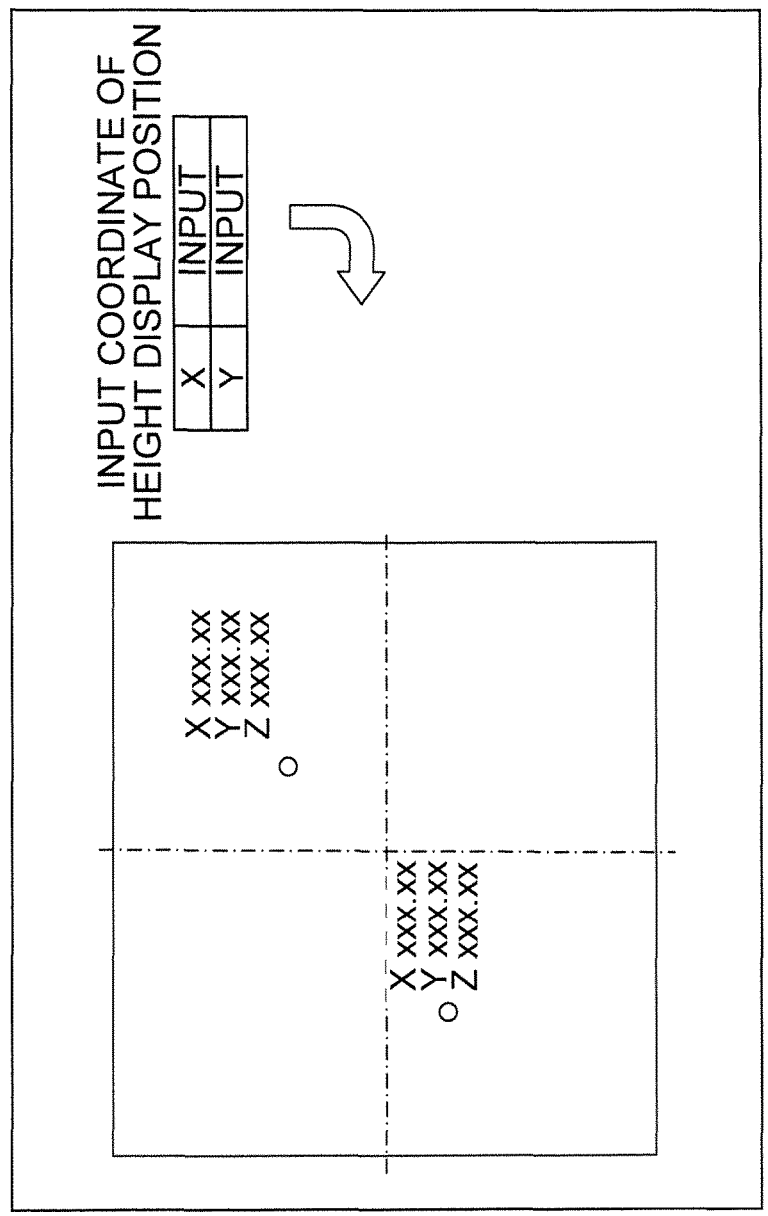
FIG. 9 illustrates a fourth display example of information on an inclination of the cushion pad.

FIG. 9 illustrates a fourth display example of information on an inclination of the cushion pad.

If the plane equation calculation unit 312 calculates the plane equation shown in Expression 5, it is possible to specify a plane of the cushion pad 202 in the xyz space.

As illustrated in FIG. 9, if the position indicator 320 (refer to FIG. 5) inputs a coordinate (x, y) of an arbitrary position, a height position (z coordinate) of the position is displayed. It is also possible to input a plurality of points. In addition, if a display with a touch panel is used for the display 340, an arbitrary position in the cushion pad shown in the display with a touch panel is touched so that a height position of the touched position can be displayed.

In addition, if there is provided a limit value calculation unit for calculating a limit value of the amount of shim adjustment at a position inputted, it is possible to display the limit value of the amount of shim adjustment at the position inputted.

Setting of an allowable range of an inclination of the cushion pad 202 at the time when die cushion force is applied by the die cushion device 200 enables the limit value calculation unit to calculate a limit value of the amount of shim adjustment at an arbitrary position from a measured inclination of the cushion pad 202 and the allowable range of an inclination of the cushion pad 202.

Accordingly, it is possible to perform shim adjustment within a range below the limit value of the amount of the shim adjustment. As a result, it is possible to cause an inclination of the cushion pad 202 not to exceed the allowable range.

(Fifth Display Example of Information on Inclination of Cushion Pad)

Figure 10:
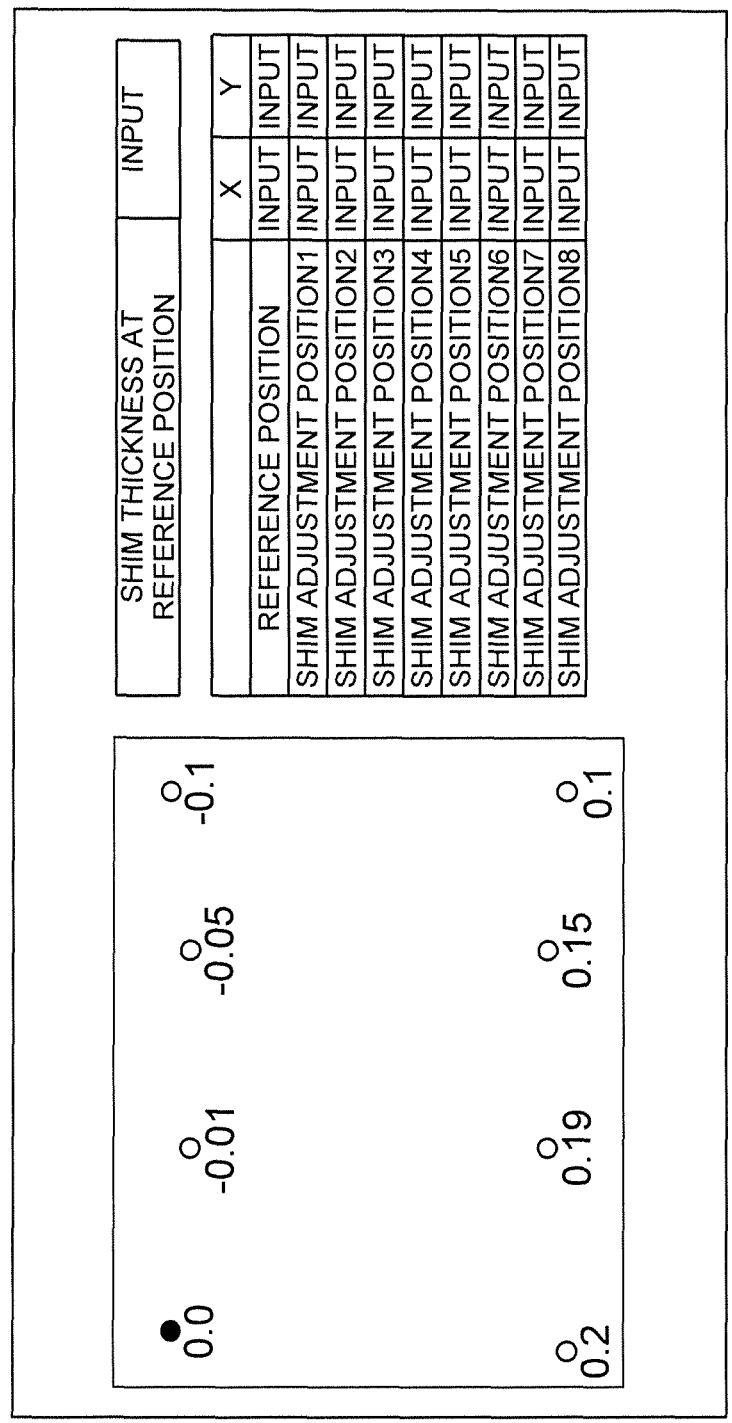
FIG. 10 illustrates a fifth display example of information on an inclination of the cushion pad.

FIG. 10 illustrates a fifth display example of information on an inclination of the cushion pad.

If the plane equation calculation unit 312 calculates the plane equation shown in Expression 5, it is possible to specify a plane of the cushion pad 202 in the xyz space.

As illustrated in FIG. 10, eight shim adjustment positions 1 to 8 are provided in a blank holder, and a user is able to input a coordinate of each of the shim adjustment positions 1 to 8. Then, if the user inputs a coordinate (x, y) of a reference position by using the position indicator 320 (refer to FIG. 5), it is possible to find out a height position (z coordinate) of the position. Accordingly, the height position is indicated as a reference (0) to cause a height position (z coordinate) of each of the shim adjustment positions to be displayed. That is, a thickness of a shim to be inserted into each of the shim adjustment positions 1 to 8 is automatically calculated and displayed.

In addition, if a user inputs a thickness of a shim at the reference position and a coordinate of the reference position, a thickness of a shim to be inserted into each of the shim adjustment positions 1 to 8 is automatically calculated and displayed with respect to the thickness of a shim to be inserted into the reference position. When a thickness of a shim to be inserted into each of the shim adjustment positions 1 to 8 is calculated, two shim adjustment positions without shim adjustment or two shim adjustment positions with a fixed amount of shim adjustment are specified.

In addition, while a screen illustrated in FIG. 9 is enabled to switch to a screen illustrated in FIG. 10, a coordinate of an arbitrary position inputted in the screen illustrated in FIG. 9 may be used as a coordinate of a shim adjustment position to be inputted in the screen illustrated in FIG. 10.

(Method for Checking Inclination of Cushion Pad)

FIG. 11 is a flow chart illustrating a first embodiment of a method for checking an inclination of a cushion pad in accordance with the present invention.

Processing below is performed after the upper die 120 is attached to the slide 104 of the press machine and the lower die 122 is attached to the bolster 108, and before the press machine 100 performs forming of material to manufacture products.

In FIG. 12, the die cushion controller 280 (refer to FIG. 4) of the die cushion device 200 is in a die cushion position control state, and the cushion pad 202 is caused to move (rise) (step S10).

Subsequently, the die cushion controller 280 determines whether the blank holder 206 reaches a press forming range (such as the cushion pad 202 reaches a die cushion standby position) by using a height position detection signal detected by the height position detectors 220 (step S12).

If it is determined that the blank holder 206 reaches the press forming range (in a case of "Yes"), the die cushion controller 280 causes the cushion pad 202 to stop (step S14).

Next, the press machine 100 is controlled to lower the slide 104 (step S16). Then the die cushion controller 280 determines whether a certain pressure is applied to the blank holder 206 while the slide 104 lowers on the basis of detection output from the pressure detector 258 (step S18). If it is determined that the certain pressure is applied to the blank holder 206 (in a case of "Yes"), the slide 104 is stopped (step S20).

Figure 12A:
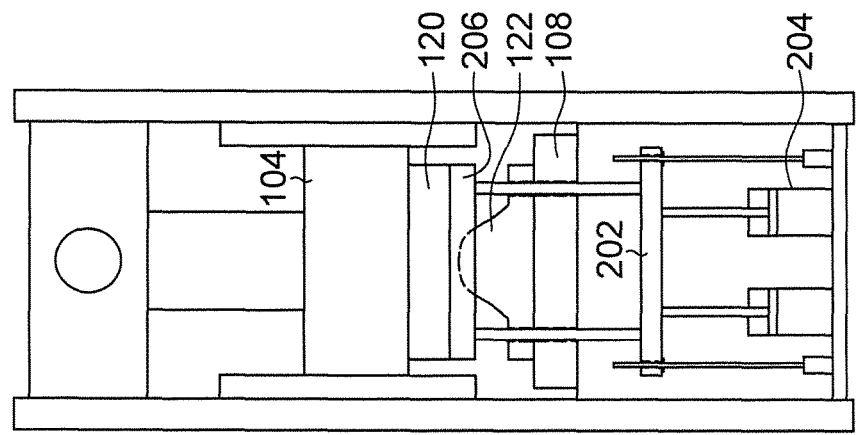
FIGS. 12A and 12B are schematic views each of which illustrates a press machine provided with a die cushion device, and which illustrate states before and after a slide and a blank holder are brought into close contact (or contact by surface not only point) with each other, respectively.
Figure 12B:
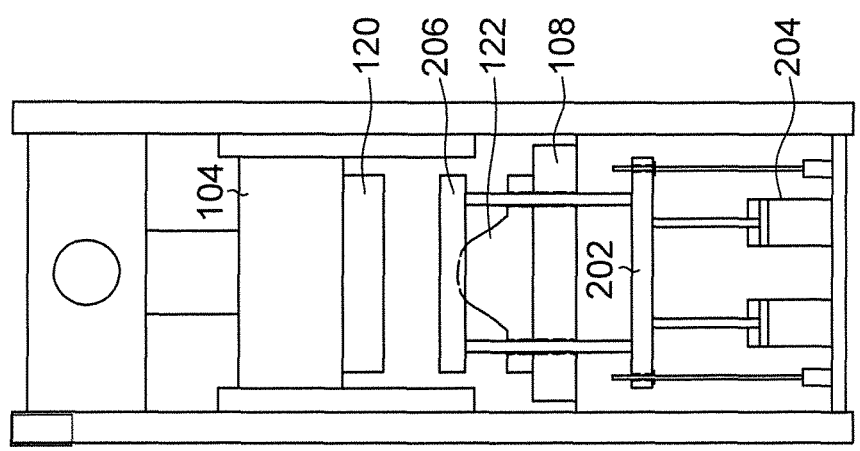

FIG. 12A illustrates a case where the blank holder 206 is positioned within the press forming range as well as the slide 104 is positioned at top dead center, and FIG. 12B illustrates a state where a certain pressure is applied to the blank holder 206 from the slide 104.

In the state illustrated in FIG. 12B, the upper die 120 attached to the slide 104 and the blank holder 206 are in close contact with each other while a certain pressure is applied. As a result, if the upper die 120 attached to the slide 104 is inclined due to 20 abrasion, deviation, or the like, the blank holder 206 in close contact with the upper die 120 (or the cushion pad 202) is inclined along with the upper die 120.

Returning to FIG. 11, when the upper die 120 and the blank holder 206 are stopped in close contact with each other while a certain pressure is applied, the die cushion controller 280 outputs a height position detection command signal. In synchronization with output timing of the height position detection command signal, the height position detectors 220LF, 220RF, and 220LB detect respective height positions of three positions different in the horizontal direction of the cushion pad 202, and then the inclination measurement unit 310 acquires the height positions (step S22).

The plane equation calculation unit 312 included in the inclination measurement unit 310 calculates a plane equation indicating a plane of the cushion pad 202 on the basis of the three height positions detected by the respective height position detectors 220LF, 220RF, and 220LB (step S24).

When the plane equation is calculated, on the basis of the plane equation calculated, an inclination of the cushion pad 202 and a height position (z) at an arbitrary position (x, y) in the cushion pad 202 are displayed in the display 340 or printed on a paper medium by the printer 350, as illustrated in FIGS. 6 to 10 (step S26).

After that, when the press machine performs forming of material to manufacture products, first a formed product is checked and it is determined whether the product is a non-defective product or not. If the product is not a non-defective product, shim adjustment for adjusting condition of contact between the upper die 120 and the blank holder 206 is performed.

In general, shim adjustment is performed in order to increase contact at a weak contact position between the upper die 120 and the blank holder 206 by inserting a shim with an appropriate thickness into a shim adjustment position corresponding to the weak contact position, however, the shim adjustment may cause the cushion pad 202 to be excessively inclined to have an adverse effect on a die cushion device. According to the present invention, it is possible to find out information on an inclination of the cushion pad in advance, so that it is possible to assist shim adjustment for forming a non-defective product to efficiently perform the shim adjustment. In addition, it is also possible to prevent such shim adjustment as causes the cushion pad 202 to be inclined beyond an allowable range, whereby it is possible to perform forming in safety without having an adverse effect on the die cushion device at the time of shim adjustment.

Figure 13:
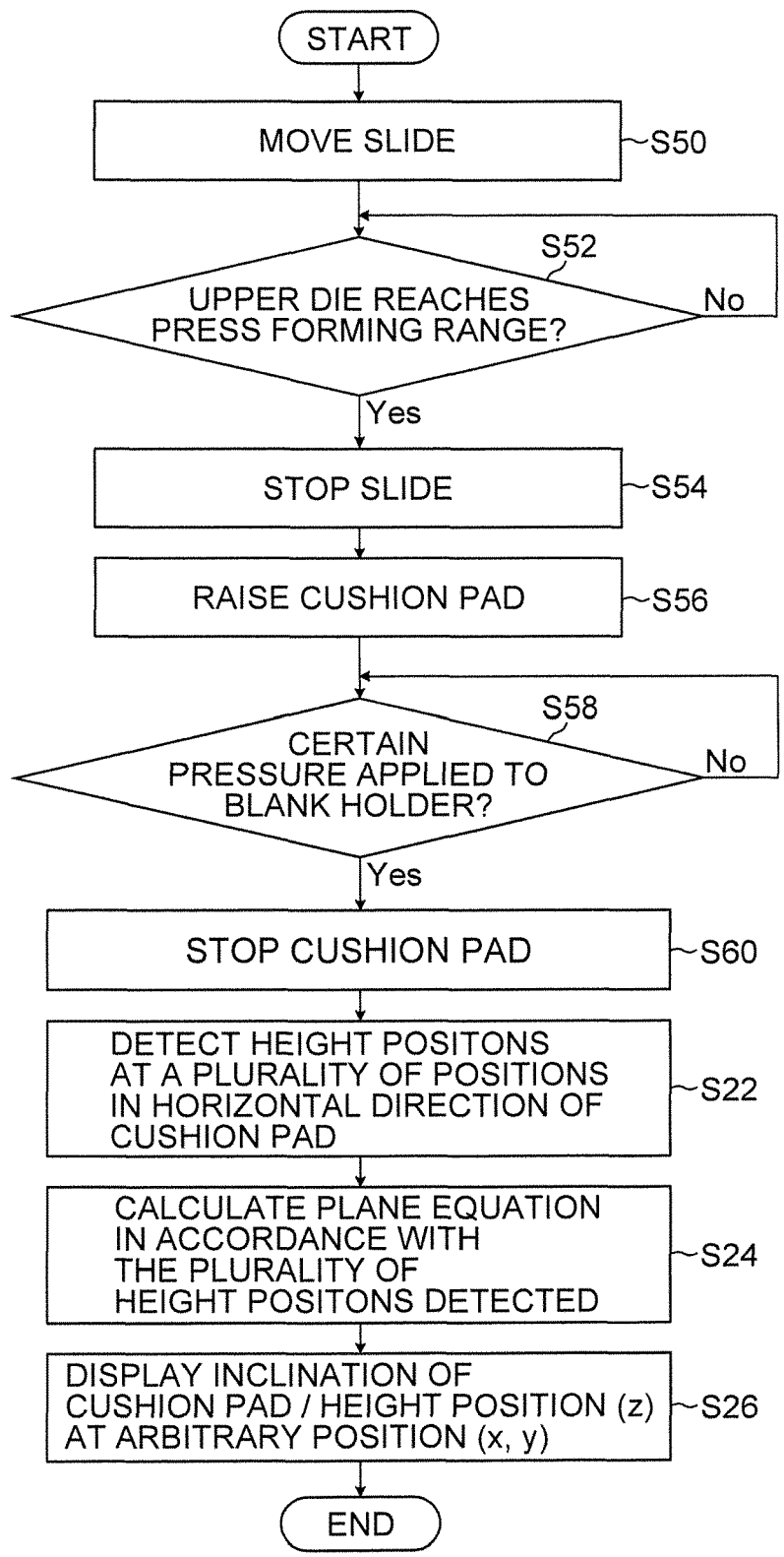
FIG. 13 is a flow chart illustrating a second embodiment of a method for checking an inclination of a cushion pad in accordance with the present invention.

FIG. 13 is a flow chart illustrating a second embodiment of a method for checking an inclination of a cushion pad in accordance with the present invention. A portion common to the flow chart illustrated in FIG. 11 is designated by the same reference numeral as that of FIG. 11 without duplicated description in detail.

The method for checking an inclination of a cushion pad of the second embodiment illustrated in FIG. 13 is different in a method of causing the upper die 120 attached to the slide 104 and the cushion pad 202 to be brought into close contact with each other as compared with the method for checking an inclination of a cushion pad of the first embodiment illustrated in FIG. 11.

As illustrated in FIG. 13, the method for checking an inclination of a cushion pad of the second embodiment first causes the slide 104 to move (lower) (step S50).

Subsequently, it is determined whether the upper die 120 attached to the slide 104 reaches a press forming range (step S52). The determination can be performed on the basis of detection output of a height position detector for detecting a height position of the slide 104 or of an angle detector for detecting an angle of a crankshaft in a case of a crank press.

If it is determined that the upper die 120 reaches the press forming range (in a case of "Yes"), the slide 104 is stopped (step S54).

Next, the die cushion controller 280 controls the cushion pad 202 to rise (step S56). Then the die cushion controller 280 determines whether a certain pressure is applied to the blank holder 206 while the cushion pad 202 rises on the basis of detection output from the pressure detector 258 (step S58). If it is determined that the certain pressure is applied to the blank holder 206 (in a case of "Yes"), the cushion pad 202 is stopped (step S60).

Since the slide 104 and the cushion pad 202 are operated in accordance with the procedure above, it is possible to cause the upper die 120 and the blank holder 206 to be in close contact with each other while a certain pressure is applied.

After that, as with the first embodiment illustrated in FIG. 11, the following processing is performed: detection of a height position (step S22); calculation of a plane equation (step S24), and display of an inclination and the like of the cushion pad (step S26).

(Others)

Figure 14:
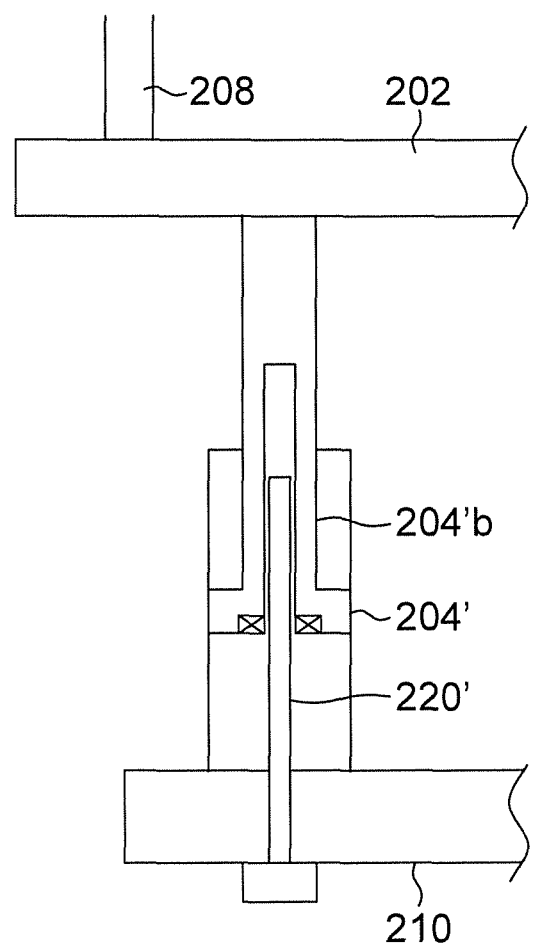
FIG. 14 illustrates another embodiment of the hydraulic cylinders and the height position detectors.
Figure 15A:
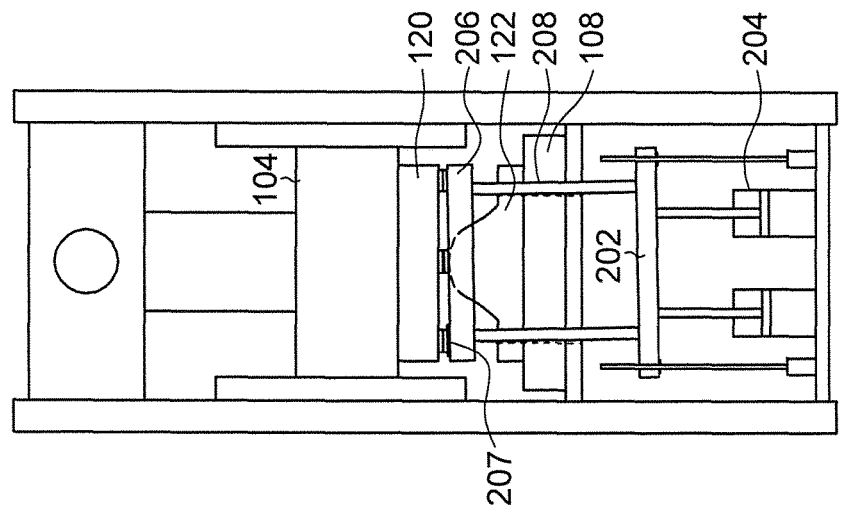
FIGS. 15A and 15B are schematic views each of which illustrates a press machine provided with a die cushion device, and which illustrate a state before starting press forming and a state during the press forming, respectively.
Figure 15B:
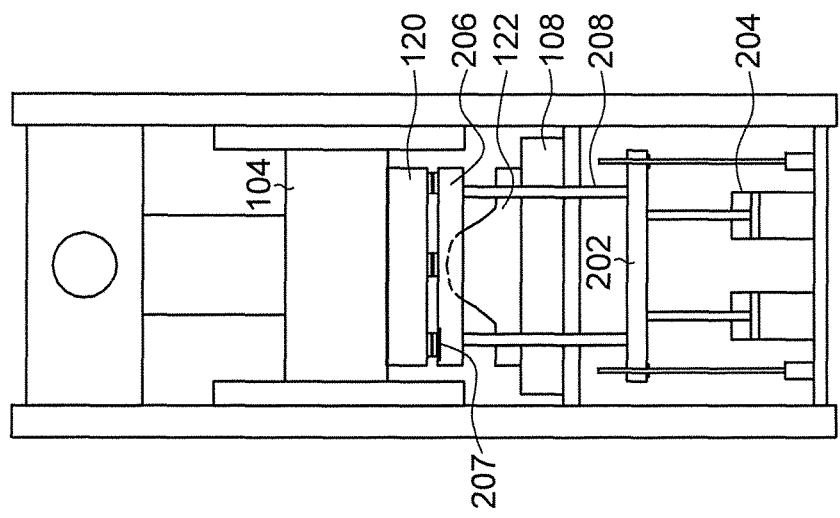

FIG. 14 illustrates a hydraulic cylinder 204' and a height position detectors 220' of another embodiment.

The hydraulic cylinder 204' illustrated in FIG. 14 is provided in its inside with the height position detectors 220'. The height position detectors 220' is composed of a magnetism scale that is fixed to the die cushion frame 210 (on a cylinder side), and a magnetism detection head that reads out the magnetism scale is fixed to a piston rod 204'*b*.

Accordingly, the height position detectors 220' is able to detect a position of the piston rod 204'*b* (or a height position (z) at a position (x, y) in the cushion pad 202 to which a leading end of the piston rod 204'*b* is attached).

In addition, although a die cushion device of the present example is configured to apply die cushion force to a cushion pad by using four hydraulic cylinders, the present invention is also applicable to a die cushion device in which die cushion force is applied to a cushion pad by using two hydraulic cylinders. In this case, for the cushion pad, two height position detectors may be provided at respective positions of the two hydraulic cylinders or near the respective positions thereof. In addition, since a term of y in the plane equation shown in Expression 4 becomes zero, it is possible to calculate the plane equation shown in Expression 4 (or an equation of a straight line in which the term of y is zero) from the two height positions detected by the respective two height position detectors.

Further, it is preferable that an apparatus for checking an inclination of a cushion pad includes a determination unit that determines whether an inclination of a cushion pad, detected by the apparatus for checking an inclination of a cushion pad, is beyond an allowable range of an inclination of the cushion pad, and a control unit that issues a warning by using a display or stops a press machine if it is determined that the inclination of the cushion pad exceeds the allowable range. In this case, a user is able to avoid the warning or the like by performing shim adjustment so that an inclination of the cushion pad is within the allowable range.

Furthermore, the plurality of height position detectors may detect respective height positions at a plurality of positions in the cushion pad, in a state where an upper die and a blank holder are in close contact with each other during press forming. For example, at the time when a slide reaches bottom dead center, the plurality of height position detectors detects respective height positions at a plurality of positions in the cushion pad. Because the upper die and the blank holder are in close contact with each other in a state where a certain pressure or more is applied during the press forming, it is possible to accurately detect the respective height positions at the plurality of positions in the cushion pad.

In this embodiment, although a hydraulic cylinder is used as a cushion pad lifting and lowering device that applies die cushion force to the cushion pad of the die cushion device as well as moves up and down the cushion pad, the present invention is not limited to the hydraulic cylinder, and another cushion pad lifting and lowering device may be applicable. For example, a plurality of ball screw mechanisms may be provided in a cushion pad so that a plurality of electric servo motors drives the respective ball screw mechanisms to perform die cushion force control and die cushion position control.

In addition, the present invention is not limited the examples above, and therefore it is needless to say that various modifications and variations are possible within a range without departing from the essence of the present invention.

What is claimed is:

1. An apparatus for checking an inclination of a cushion pad in a die cushion device including a cushion pad lifting and lowering mechanism that supports the cushion pad and generates die cushion force when a slide of a press machine is lowered, the apparatus comprising:
    a plurality of height position detectors that detect a plurality of respective height positions in a vertical direction at a plurality of positions different in a horizontal direction of the cushion pad;
    a controller that measures information on the inclination of the cushion pad, where the measured inclination includes inclination caused by shim adjustment, in accordance with the plurality of height positions detected by the plurality of respective height position detectors; and
    an output that outputs the information on the inclination of the cushion pad measured by the controller in a visible manner,
    wherein the plurality of height position detectors detect the plurality of respective height positions in a state where an upper die attached to the slide and a blank holder coupled to the cushion pad through a plurality of cushion pins are in close contact with each other,
    wherein a shim is inserted into a shim adjustment position, and the shim adjustment position is located in the blank holder coupled to the cushion pad through the plurality of cushion pins,
    wherein the controller calculates a limit value of an amount of shim adjustment at the shim adjustment position in accordance with the measured information on the inclination of the cushion pad and an allowable range of the information on the inclination of the cushion pad, and
    wherein the output outputs the limit value of the amount of shim adjustment at the shim adjustment position, calculated by the controller, in a visible manner.

2. The apparatus for checking the inclination of the cushion pad according to claim 1,
    wherein the output causes a display to display the information on the inclination of the cushion pad, or causes a printer to print the information on a paper medium.

3. The apparatus for checking the inclination of the cushion pad according to claim 1,
    wherein the controller that calculates a plane equation of the cushion pad in accordance with the plurality of height positions detected by the plurality of respective height position detectors, and wherein the output outputs information showing the inclination of the cushion pad in accordance with the plane equation calculated by the controller, in a visible manner.

4. The apparatus for checking the inclination of the cushion pad according to claim 1, further comprising a position indicator that specifies one or more arbitrary positions in the horizontal direction of the cushion pad, wherein the controller is further configured to:
calculate a plane equation of the cushion pad in accordance with the plurality of height positions detected by the plurality of respective height position detectors; and
calculate a height position at the specified arbitrary position in accordance with the calculated plane equation and the arbitrary position specified by the position indicator, and
wherein the output outputs information showing the calculated height position, at the arbitrary position specified by the position indicator, in a visible manner.

5. The apparatus for checking the inclination of the cushion pad according to claim 1, wherein the output outputs the information on the inclination of the cushion pad to a storage unit by associating the information with at least one of the upper die and a lower die attached to the press machine so that the storage unit stores the information.

6. The apparatus for checking the inclination of the cushion pad according to claim 5, further comprising an input that reads out the stored information on the inclination of the cushion pad from the storage unit in accordance with the at least one of the upper die and the lower die attached to the press machine, the information being associated with the at least one of the upper die and the lower die, wherein the output outputs the information on the inclination of the cushion pad, read out by the input, in a visible manner.

7. The apparatus for checking the inclination of the cushion pad according to claim 1, wherein the controller is further configured to:
determine measured information on the inclination of the cushion pad is beyond an allowable range; and
issue a warning or stop the press machine if it is determined that the information on the inclination of the cushion pad is beyond the allowable range.

8. The apparatus for checking the inclination of the cushion pad according to claim 1, wherein the plurality of height position detectors detect the plurality of respective height positions when the upper die and the blank holder are in close contact with each other during press forming.

9. A method for checking an inclination of a cushion pad used in a die cushion device including a cushion pad lifting and lowering mechanism that supports the cushion pad and generates die cushion force when a slide of a press machine is lowered, the method comprising the steps of:
detecting, by a plurality of height position detectors, a plurality of respective height positions in a vertical direction at a plurality of positions different in a horizontal direction of the cushion pad;

measuring, by a controller, information on the inclination of the cushion pad, where the measured inclination includes inclination caused by shim adjustment, in accordance with the plurality of height positions detected; and
outputting, by an output, the information on the inclination of the cushion pad measured in a visible manner,
wherein the plurality of height position detectors detect the plurality of respective height positions in a state where an upper die attached to the slide and a blank holder coupled to the cushion pad through a plurality of cushion pins are in close contact with each other,
wherein a shim is inserted into a shim adjustment position, and the shim adjustment position is located in the blank holder coupled to the cushion pad through the plurality of cushion pins,
wherein the method further comprises a step of calculating, by the controller, a limit value of an amount of shim adjustment at the shim adjustment position in accordance with the information on the inclination of the cushion pad measured by the controller and an allowable range of the information on the inclination of the cushion pad, and
wherein the output outputs the limit value of the amount of shim adjustment at the shim adjustment position, calculated by the controller, in a visible manner.

10. The method for checking the inclination of the cushion pad according to claim 9,
wherein the plurality of height position detectors detect the plurality of respective height positions when the upper die and the blank holder are in close contact with each other during press forming.

11. The method for checking the inclination of the cushion pad according to claim 9, further comprising the steps of:
moving the cushion pad until the blank holder reaches a press forming range by using the cushion pad lifting and lowering mechanism and then stopping the cushion pad; and
lowering the slide until the state where the upper die attached to the slide is brought into close contact with the blank holder by stopping the slide when a certain pressure is applied to the blank holder,
wherein the plurality of height position detectors detect the plurality of respective height positions when the upper die and the blank holder are in close contact with each other and are stopped in the state where the certain pressure is applied.

12. The method for checking the inclination of the cushion pad according to claim 9, further comprising the steps of:
moving the slide until the upper die attached to the slide reaches a press forming range and then stopping the slide; and
raising the cushion pad until the blank holder is brought into close contact with the upper die by using the cushion pad lifting and lowering mechanism and stopping the cushion pad when a certain pressure is applied to the blank holder,
wherein the plurality of height position detectors detect the plurality of respective height positions the state where the upper die and the blank holder are in close contact with each other.

* * * * *